United States Patent Office 2,861,351
Patented Nov. 25, 1958

2,861,351

METHOD OF DRYING LEACHED POROUS HIGH SILICA GLASS

Wendell O. Smith, Corning, N. Y., assignor to Corning Glass Works, Corning, N. Y., a corporation of New York No Drawing. Application September 16, 1957
Serial No. 683,966

2 Claims. (Cl. 34—7)

This invention, which is a continuation in part of my pending application Serial No. 476,589, now abandoned, filed December 20, 1954, relates to the method of producing high silica glass, described in Patent No. 2,286,275, and particularly to an improvement in such method.

The patent shows that a glass containing over 93% $SiO_2$ can be produced by melting and shaping a particular easily meltable glass of lower silica content and extracting therefrom soluble, non-siliceous constituents by leaching the glass in dilute acid to leave a highly siliceous structure retaining its original shape and having a multiplicity of intercommunicating submicroscopic pores, which porous glass can thereafter be dried and heated without fusion to close the pores and convert it to a non-porous, transparent, vitreous condition.

The drying of the wet porous glass is accompanied by an overall shrinkage which initially at least establishes a tensional stress in the surface of the article. Such stress may become large enough to cause breakage if the glass is dried too rapidly. The initial drying, therefore, is normally carried out slowly at room temperature to remove the loosely held water filling the pores. The drying rate may then be increased by raising the temperature of the porous glass gradually to about 150° C. and then more rapidly to the final firing temperature at about 1225° C. in order to eliminate the water, which is held tenaciously by adsorption on the walls of the pores, and water of constitution in the silica structure.

Despite the slow initial drying, however, an article having a cut edge, such as a cut sheet, and articles of non-uniform thickness tend to dry rapidly enough at the cut edges and in the portions of excessive thickness to form cracks at these localities during the early stages of drying. Such tendency for the formation of drying cracks becomes more pronounced and more troublesome as the thickness of the sheet or article is increased and the breakage loss so caused amounts to more than 50% of the ware.

It is an object of this invention to provide an improvement in the drying step of the method of producing such high silica glass articles whereby such difficulties are overcome and whereby the formation of cracks and the breakage of the articles are prevented with a substantial increase in the volume of production.

In accordance with the invention there is provided a method of drying a water-saturated, porous article of glass containing over 93% $SiO_2$ and having a portion in which drying stresses tend to form cracks during drying and firing which comprises applying to at least such portion and in contact therewith a water-soluble, waxy polyethylene glycol and thereafter removing the loosely held water from the pores by evaporation.

Polyethylene glycol varies in molecular weight and melting point depending upon the degree of polymerization, the lowest polymers being liquid at room temperature and those having molecular weights above about 900 being wax-like solids at room temperature. Only the waxy polyethylene glycols are suitable for the present purpose of their favorable and advantageous combination of properties which include solubility in water, melting points below the boiling point of water, boiling points above the boiling point of water, lack of inorganic constituents and elements which attack glass, and complete volatility. They are produced and sold by Carbide and Carbon Chemicals Corp. of Niagara Falls, N. Y., under the trademark "Carbowax" and the various polymers are designated and identified by code numbers indicating their approximate molecular weights.

In practicing the invention the leached porous glass article, after having been thoroughly washed in cold water to remove all dissolved inorganic material, is permitted to drain until its surface is no longer wet, after which the molten waxy polyethylene glycol is applied by brushing it on to the portion to be coated. Alternatively such portion may be dipped into the molten material, if the shape of the article permits. The entire surface of the porous glass may thus be coated, if desired, but this involves an unnecessary expenditure of the material. The article is then permitted to dry at room temperature, preferably at 20° to 25° C., to remove the loosely held water within the pores, after which further drying may be carried out at a more rapid rate as is pointed out above, the presence or absence of the polyethylene glycol being immaterial for the further drying of the article.

The polyethylene glycol applied in the above-described manner, effectively slows the rate of evaporation of the water from the pores in the portion of the article beneath it, thereby greatly decreasing or eliminating the formation of drying cracks and raising the volume of production generally to more than 90% of the processed ware.

While it may be possible, on account of its water solubility, that the material diffuses into the water within the pores to some extent it is believed that such diffusion, if it occurs, is not very extensive on account of the counterflow of the evaporating water. In any event material which diffuses into the pores is eliminated by the time the article has been heated to the final firing temperature. In fact the waxy material, although it adheres well to the wet porous glass, advantageously loses its adhesion and falls away when the step of drying at room temperature is substantially complete.

In order to show by way of example the relative effectiveness of waxy polyethylene glycol as compared with the liquid monomer and with glycerine in reducing the breakage of the porous glass sheets during their drying and subsequent firing at high temperature, sheets of the water-saturated porous glass, approximately 16 inches square and 3/8 inch thick, were individually coated on their peripheral edges with molten, waxy polyethylene glycols having average molecular weights of 1000, 4000, and 6000, respectively, and with liquid monomeric ethylene glycol and with glycerine according to the above described method and were thereafter dried at room temperature and fired up to 1250° C. The results together with those of similar but uncoated porous glass sheets are as follows:

| Coating material | Average mol. wt. | Number of sheets | Inches thick | Number broken drying | Number broken firing | Percent good |
|---|---|---|---|---|---|---|
| Polyeth. glycol | 1,000 | 20 | 3/8 | 0 | 0 | 100 |
| Do | 4,000 | 10 | 3/8 | 1 | 1 | 80 |
| Do | 6,000 | 24 | 3/8 | 1 | 0 | 96 |
| Monomer | | 10 | 3/8 | 9 | 1 | 0 |
| Glycerine | | 10 | 3/8 | 7 | 0 | 30 |
| None | | 10 | 3/8 | 9 | 1 | 0 |

What is claimed is:

1. The method of drying a water-saturated, porous glass article containing over 93% $SiO_2$ and having a portion in which drying stresses tend to form cracks during drying and firing which comprises forming on at least such portion a coating of a water-soluble, waxy polyethylene glycol and thereafter removing the loosely held water from the pores by evaporation.

2. The method of claim 1 in which the article is a glass sheet.

References Cited in the file of this patent

UNITED STATES PATENTS

| | | |
|---|---|---|
| 2,203,589 | Baymiller | June 4, 1940 |
| 2,643,231 | Erickson | June 23, 1953 |
| 2,701,777 | Farris | Feb. 8, 1955 |

UNITED STATES PATENT OFFICE

CERTIFICATE OF CORRECTION

Patent No. 2,861,351

November 25, 1958

Wendell O. Smith

It is hereby certified that error appears in the printed specification of the above numbered patent requiring correction and that the said Letters Patent should read as corrected below.

Column 1, line 72, after "purpose" insert -- on account --.

Signed and sealed this 9th day of June 1959.

(SEAL)
Attest:

KARL H. AXLINE
Attesting Officer

ROBERT C. WATSON
Commissioner of Patents